United States Patent
Sun (10) Patent No.: US 7,798,700 B2
(45) Date of Patent: Sep. 21, 2010

(54) LIGHT GUIDE PLATE WITH PROTRUSION BACKLIGHT MODULE WITH SAME, AND LIQUID CRYSTAL DISPLAY WITH SAME

(75) Inventor: He-Xin Sun, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 242 days.

(21) Appl. No.: 12/154,833

(22) Filed: May 27, 2008

(65) Prior Publication Data

US 2008/0291697 A1    Nov. 27, 2008

(30) Foreign Application Priority Data

May 25, 2007    (CN)    .................... 2007 2 0120347 U (51) Int. Cl.
*F21V 7/04*    (2006.01)
(52) U.S. Cl. ............................. 362/628; 362/26; 349/58
(58) Field of Classification Search ................ 362/628, 362/615, 26, 27, 600, 632, 633, 634
See application file for complete search history.

(56) References Cited

U.S. PATENT DOCUMENTS

| | | | | |
|---|---|---|---|---|
| 5,988,827 A * | 11/1999 | Lee | ............................. | 362/633 |
| 6,512,557 B1 * | 1/2003 | Miwa | ........................... | 349/58 |
| 6,626,550 B2 * | 9/2003 | Choi | ........................... | 362/632 |
| 6,820,992 B2 * | 11/2004 | Yu et al. | ...................... | 362/633 |
| 6,961,103 B2 | 11/2005 | Sung et al. | | |
| 7,092,048 B2 * | 8/2006 | Jeong | ........................... | 349/58 |

\* cited by examiner

*Primary Examiner*—Gunyoung T Lee
(74) *Attorney, Agent, or Firm*—Wei Te Chung (57) ABSTRACT

A light guide plate includes: a light emitting surface; a bottom surface opposite to the light emitting surface; a light incident surface perpendicularly connected with the light emitting surface; a first side surface perpendicularly connected with both the light incident surface and the light emitting surface; a second side surface opposite to the first side surface; two protrusions outwardly extending from the first side surface; and two protrusions outwardly extending from the second side surface. A thickness of each protrusion of the first side surface decreases with increasing distance away from the light incident surface, and a thickness of each protrusion of the second side surface also decreases with increasing distance away from the light incident surface.

15 Claims, 6 Drawing Sheets

LIGHT GUIDE PLATE WITH PROTRUSION BACKLIGHT MODULE WITH SAME, AND LIQUID CRYSTAL DISPLAY WITH SAME

FIELD OF THE INVENTION

The present invention relates to a light guide plate with protrusions, a backlight module including the light guide plate, and a liquid crystal display (LCD) including the backlight module.

GENERAL BACKGROUND

LCDs are commonly used as display devices for compact electronic apparatuses, not only because they provide good quality images with little power consumption but also because they are very thin. The liquid crystal molecules in an LCD do not emit any light themselves. The liquid crystal molecules have to be lit by a light source so as to clearly and sharply display text and images. Thus, a backlight module for an LCD is generally needed.

Figure 8:
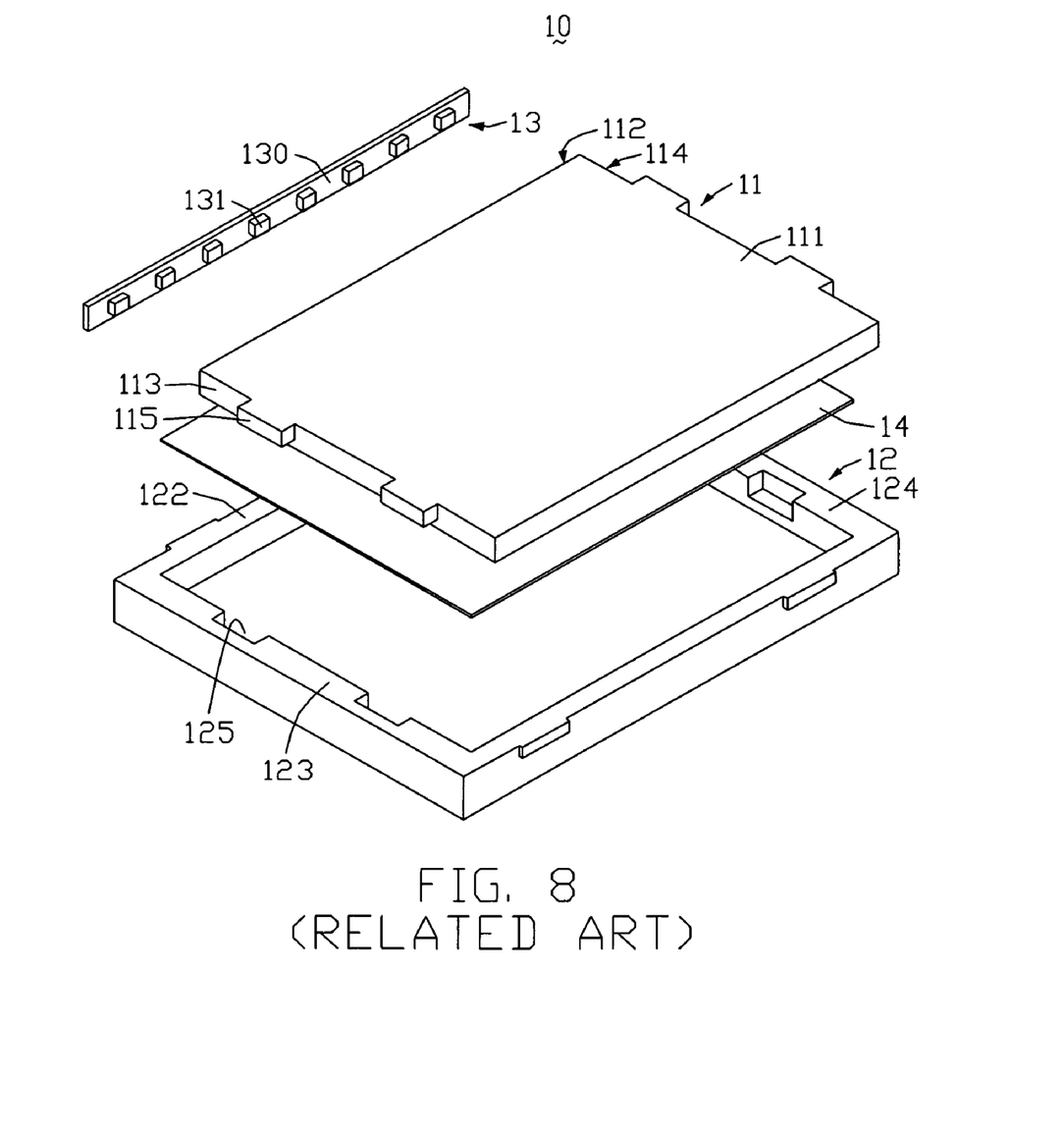
FIG. 8 is an exploded, isometric view of a conventional backlight module.

Referring to FIG. 8, a typical backlight module 10 includes a light guide plate 11, a frame 12, a light source 13, and a reflector film 14. The frame 12 is used for accommodating the light guide plate 11, the light source 13, and the reflector film 14.

The light guide plate 11 includes a light emitting surface 111, a light incident surface 112 perpendicularly connected with the light emitting surface 111, a first side surface 113 perpendicularly connected with both the light incident surface 112 and the light emitting surface 111, and a second side surface 114 opposite to the first side surface 113. A pair of protrusions 115 outwardly extends from the first side surface 113, and another pair of protrusions 115 outwardly extends from the second side surface 114. Any part of each of the protrusions 115 has the same thickness.

The frame 12 includes a first side wall 123 corresponding to the first side surface 113 of the light guide plate 11, a second side wall 124 corresponding to the second side surface 114 of the light guide plate 11, and a third side wall 122 corresponding to the light incident surface 112 of the light guide plate 11. The first side wall 123 has two notches 125 corresponding to the two protrusions 115 of the first side surface 113. The second side wall 124 has two notches 125 corresponding to the two protrusions 115 of the second side surface 114.

The light source 13 includes a plurality of light emitting diodes 131 and a metal strip 130. The plurality of light emitting diodes 131 are adhered on the metal strip 130.

Figure 9:
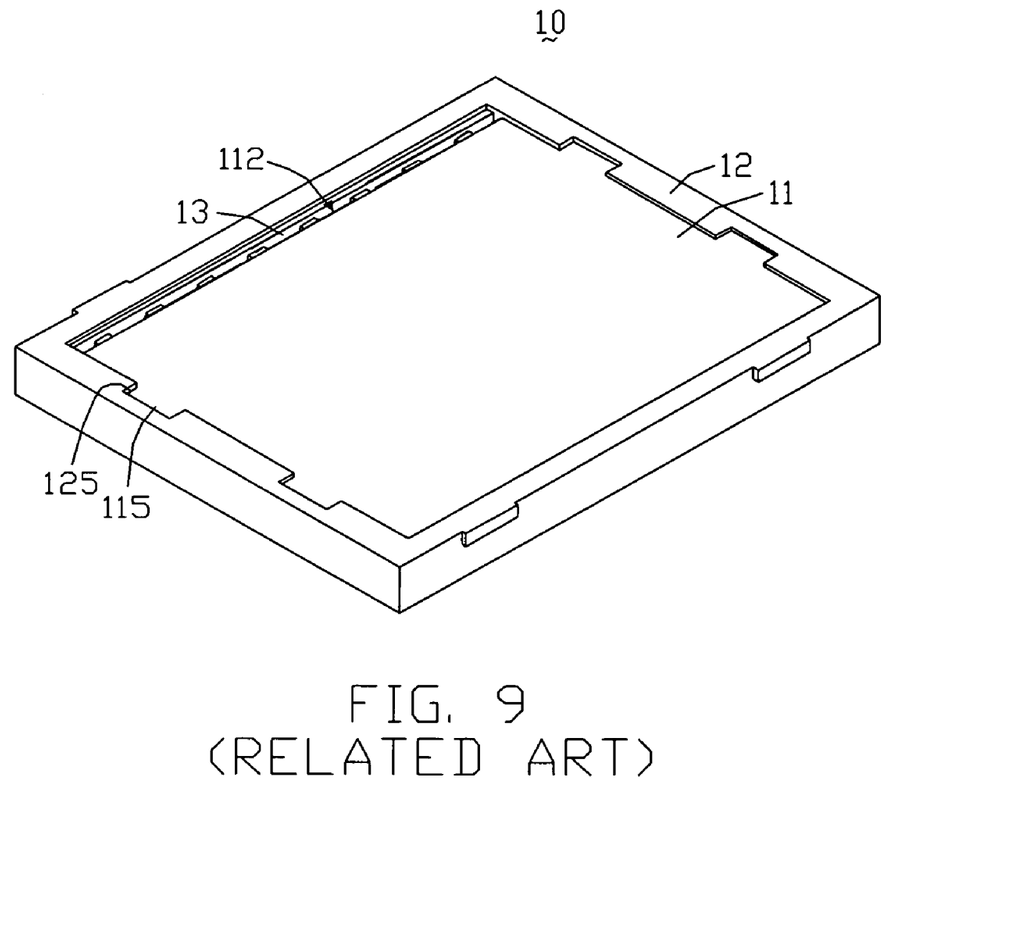
FIG. 9 is an assembled view of the backlight module of FIG. 8.

FIG. 9 is an assembled view of the backlight module 10. In assembly, firstly, the light guide plate 11 is put into the frame 12 with the four notches 125 accommodating the four protrusions 115 of the light guide plate 11 respectively. Then the light source 13 is put into a space between the light incident surface 112 of the light guide plate 11 and the third side wall 122 of the frame 12. The light emitting diodes 131 face toward the light incident surface 112.

In practice, the size of the light guide plate 11 does not perfectly accord with the size of the frame 12. Typically, the light guide plate 11 is slightly smaller than corresponding inner dimensions of the frame 12. Thus a gap may exist between the light emitting diodes 131 and the light incident surface 112 of the light guide plate 11. In this circumstance, some of the light beams emitting from the light emitting diodes 131 may not enter the light guide plate 11, and instead leak out from the gap. Therefore, a light utilization efficiency of the backlight module 10 is reduced.

What is needed, therefore, is a light guide plate, a backlight module including the light guide plate, and an LCD including the backlight module, all of which can overcome the above-described deficiencies.

SUMMARY

A light guide plate includes: a top light emitting surface; a bottom surface; a light incident surface perpendicularly adjacent to the light emitting surface; a first side surface perpendicularly adjacent to both the light incident surface and the light emitting surface; a second side surface, the first and second side surfaces being at opposite sides of the light guide plate; at least one protrusion outwardly extending from the first side surface; and at least one protrusion outwardly extending from the second side surface. A thickness of the at least one protrusion of the first side surface decreases with increasing distance away from the light incident surface, and a thickness of the at least one protrusion of the second side surface decreases with increasing distance away from the light incident surface.

A backlight module includes a light guide plate. The light guide plate includes: a light emitting surface; a bottom surface opposite to the light emitting surface; a light incident surface perpendicularly connected with the light emitting surface; a first side surface perpendicularly connected with both the light incident surface and the light emitting surface; a second side surface opposite to the first side surface; at least one protrusion outwardly extends from the first side surface; and at least one protrusion outwardly extends from the second side surface. Each protrusion defines a length along a direction perpendicular to the light incident surface, and a center of gravity of each protrusion is between a center of the length of the protrusion and an end of the protrusion closest to the light incident surface.

A liquid crystal display includes a liquid crystal display panel, and a backlight module positioned adjacent to the liquid crystal panel. The backlight module includes a light guide plate. The light guide plate includes: a light emitting surface; a bottom surface opposite to the light emitting surface; a light incident surface perpendicularly connected with the light emitting surface; a first side surface perpendicularly connected with both the light incident surface and the light emitting surface; a second side surface opposite to the first side surface; at least one protrusion outwardly extends from the first side surface; and at least one protrusion outwardly extends from the second side surface. A center of gravity of each protrusion closes to the light incident surface of the light guide plate.

Other novel features and advantages will become more apparent from the following detailed description when taken in conjunction with the accompanying drawings.

DETAILED DESCRIPTION OF PREFERRED EMBODIMENTS

Reference will now be made to the drawings to describe preferred and exemplary embodiments in detail.

Figure 1:
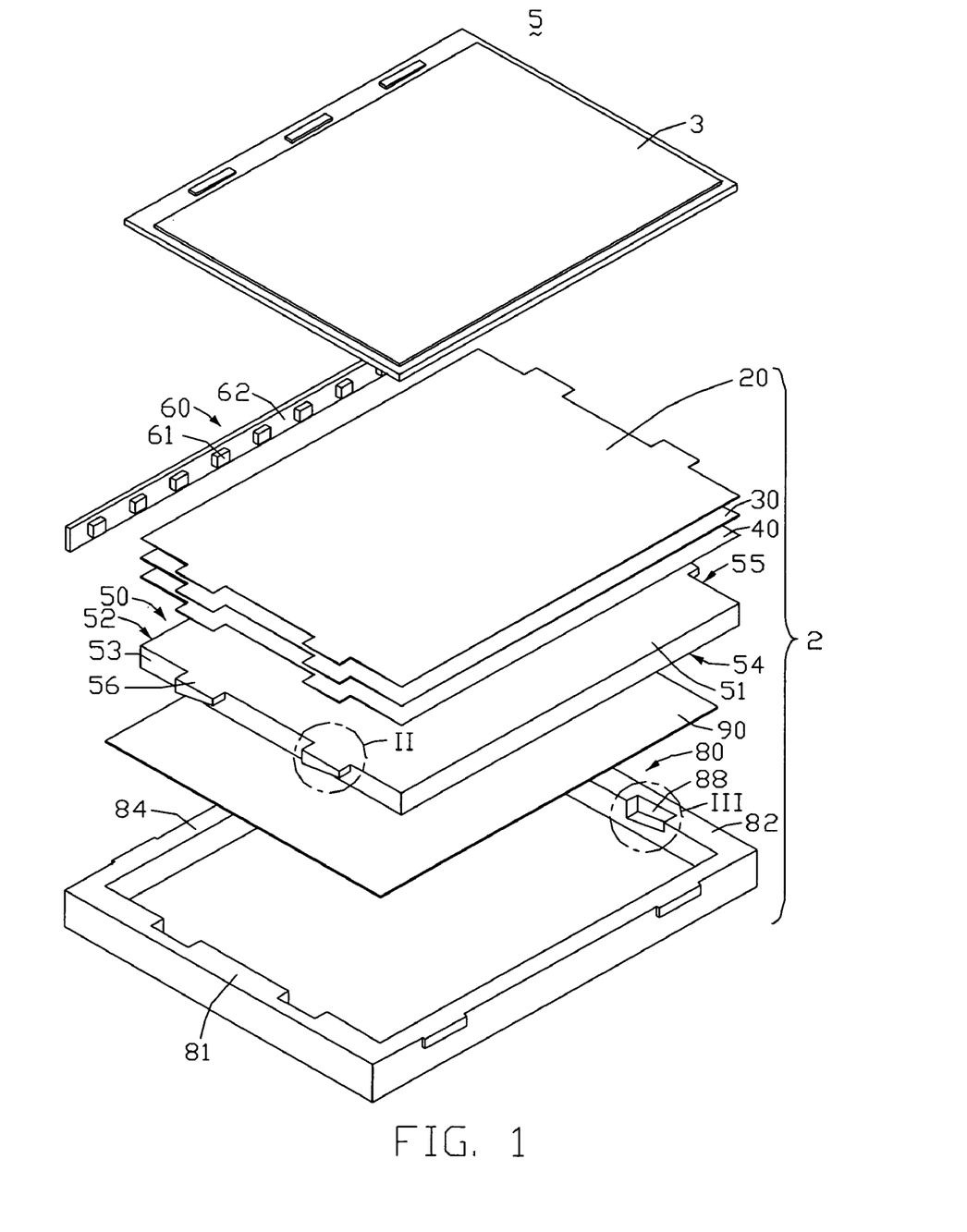
FIG. 1 is an exploded, isometric view of an LCD according to a first exemplary embodiment of the present invention, the LCD including a backlight module.

FIG. 1 is an exploded, isometric view of an LCD according to an exemplary embodiment of the present invention. The LCD 5 includes a backlight module 2 and an LCD panel 3.

The backlight module 2 includes a first brightness enhancement film 20, a second brightness enhancement film 30, a diffusing film 40, a light guide plate 50, a frame 80, a light source 60, and a reflector film 90. The frame 80 is used for accommodating the reflector film 90, the light source 60, the light guide plate 50, the diffusing film 40, the second brightness enhancement film 30, and the first brightness enhancement film 20.

The light guide plate 50 includes a light emitting surface 51, a bottom surface 54 opposite to the light emitting surface 51, a light incident surface 52 perpendicularly connected with the light emitting surface 51, a first side surface 53 perpendicularly connected with both the light incident surface 52 and the light emitting surface 51, and a second side surface 55. The first and second side surfaces 53, 55 are at opposite sides of the light guide plate 50. A pair of protrusions 56 outwardly extends from the first side surface 53, and another pair of protrusions 56 outwardly extends from the second side surface 55.

The frame 80 includes a first side wall 81 corresponding to the first side surface 53 of the light guide plate 50, a second side wall 82 corresponding to the second side surface 55 of the light guide plate 50, and a third side wall 84 corresponding to the light incident surface 52 of the light guide plate 50. The first side wall 81 has two notches 88 corresponding to the two protrusions 56 of the first side surface 53. The second side wall 82 has two notches 88 corresponding to the two protrusions 56 of the second side surface 55.

The light source 60 includes a plurality of light emitting diodes 61 and a metal strip 62. The light emitting diodes 61 are adhered on the metal strip 62. The metal strip 62 can be a copper strip or a platinum strip.

Figure 2:
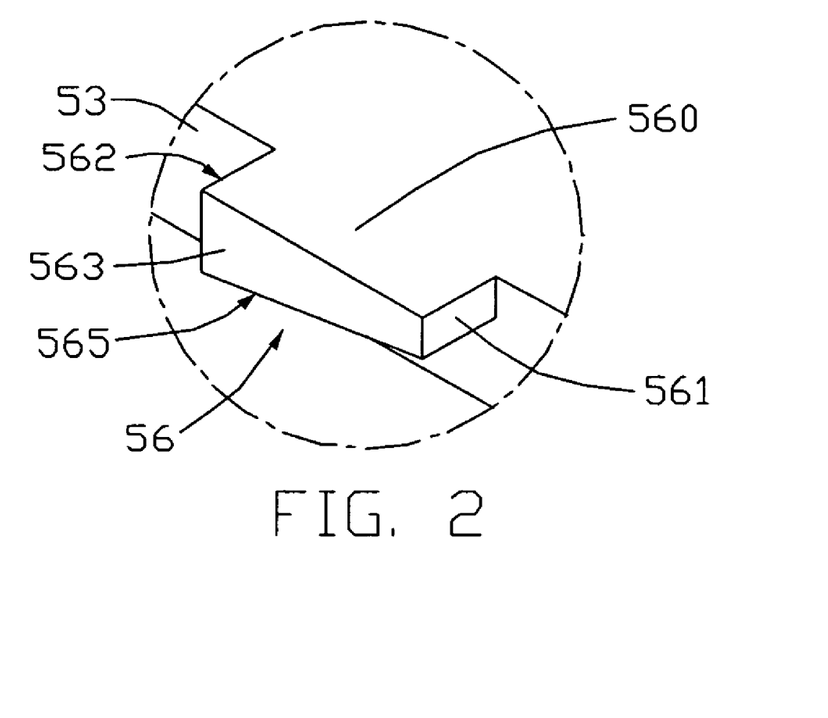
FIG. 2 is an enlarged view of a circled portion II of FIG. 1.

Referring also to FIG. 2, each of the protrusions 56 includes a top surface 560, a bottom surface 565 opposite to the top surface 560, a first side surface 561 connected with both the top surface 560 and the bottom surface 565, a second side surface 562, and a third side surface 563 parallel to the first side surface 53 of the light guide plate 50. The first and second side surfaces 561, 562 are at opposite sides of the light guide plate 50. The top surface 560 and the light emitting surface 51 of the light guide plate 50 are coplanar. The first side surface 561 is parallel to the second side surface 560, and both the first side surface 561 and the second side surface 562 are perpendicular to the top surface 560. The third surface 563 is a right-angled trapezoid. A length of a border where the first side surface 561 and the third side surface 563 intersect is less than that of a border where the second side surface 562 and the third side surface 563 intersect. A distance between a center of gravity of the protrusion 56 and the first side surface 561 is greater than that between the center of gravity of the protrusion 56 and the second side surface 562. A distance between the first side surface 561 and the light incident surface 52 of the light guide plate 50 is greater than that between the second side surface 562 and the light incident surface 52 of the light guide plate 50.

Figure 3:
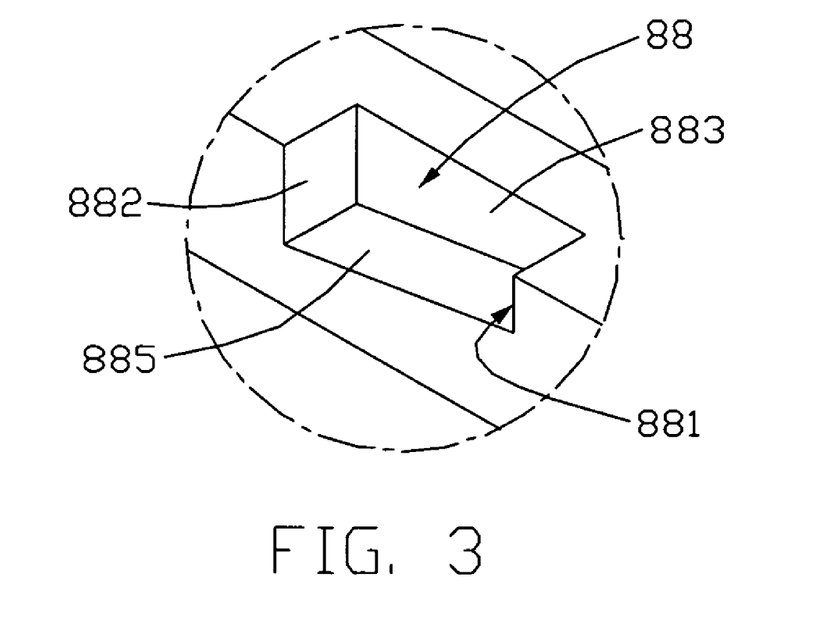
FIG. 3 is an enlarged view of a circled portion III of FIG. 1.

Referring also to FIG. 3, each of the notches 88 includes a first side surface 881, a second side surface 882 parallel to the first side surface 881, a third side surface 883 connected with both the first side surface 881 and the second side surface 882, and a bottom surface 885. The first side surface 881, the second side surface 882, and the third side surface 883 are all perpendicular to the top surface of the frame 80. The bottom surface 885 is set below a top surface (not labeled) of the frame 80. The third side surface 883 is a right-angled trapezoid. A length of a border where the first side surface 881 and the third side surface 883 intersect is less than that of a border where the second side surface 882 and the third side surface 883 intersect. A distance between the first side surface 881 and the second side surface 882 is greater than a distance between the first side surface 561 and the second side surface 562 of the corresponding protrusion 56.

Figure 4:
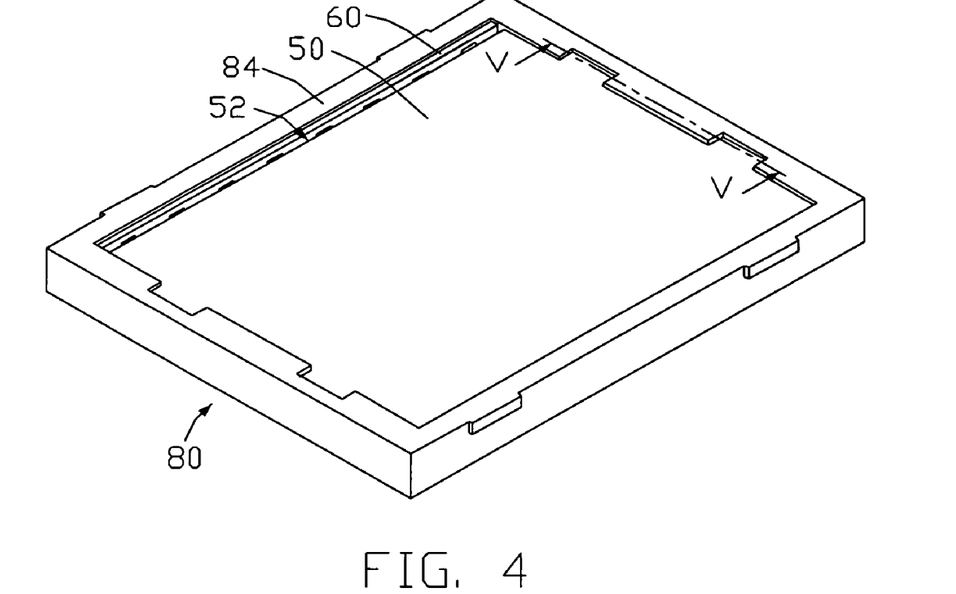
FIG. 4 is an assembled view of the backlight module of FIG. 1.

FIG. 4 is an assembled view of the backlight module 2. In assembly, firstly, the reflector film 90 is put into the frame 80. Secondly, the light guide plate 50 is put into the frame 80, with the four notches 88 accommodating the four protrusions 56 of the light guide plate 50 respectively. Thirdly, the light source 60 is put into a space between the light incident surface 52 of the light guide plate 50 and the third side wall 84 of the frame 80, with the plurality of light emitting diodes 61 facing toward the light incident surface 52. Finally, the diffusing film 40, the second brightness enhancement film 30, and the first brightness enhancement film 20 are put into the frame 80.

Figure 5:
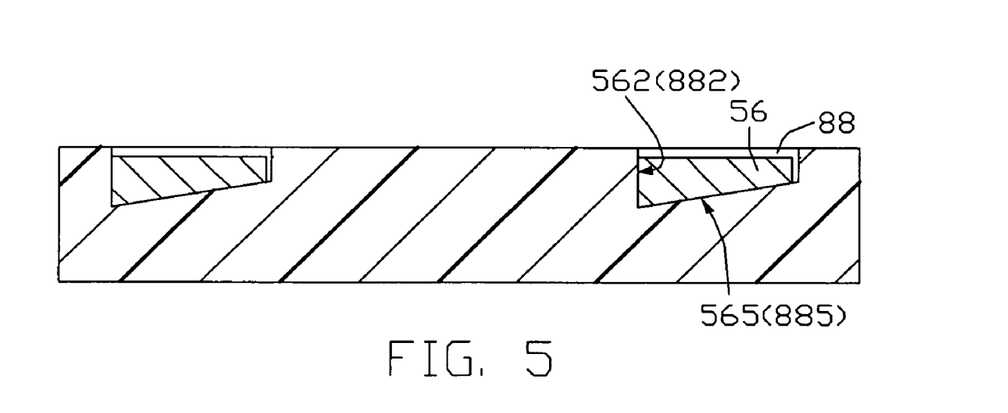
FIG. 5 is a cross-sectional view taken along line V-V of FIG. 4.

Referring also to FIG. 5, the bottom surface 565 of each protrusion 56 and the bottom surface 885 of each notch 88 are both inclines. Furthermore, the center of gravity of each protrusion 56 is closer to the second side surface 562 thereof. Thus the four protrusions 56 tend to slide toward to the light incident surface 52 of the light guide plate 50, so that finally the second side surfaces 562 of the protrusions 56 contacts the second side surfaces 882 of the notches 88. The light incident surface 52 of the light guide plate 50 contacts the plurality of light emitting diodes 61 correspondingly.

Because the light incident surface 52 of the light guide plate 50 contacts the plurality of light emitting diodes 61, a gap between the light incident surface 52 and the light emitting diodes 61, as is the case with the conventional backlight module 10, disappears. Light beams emitting from the light emitting diodes 61 almost enter into the light guide plate 50. Accordingly, a light utilization efficiency of the backlight module 2 is increased.

Figure 6:
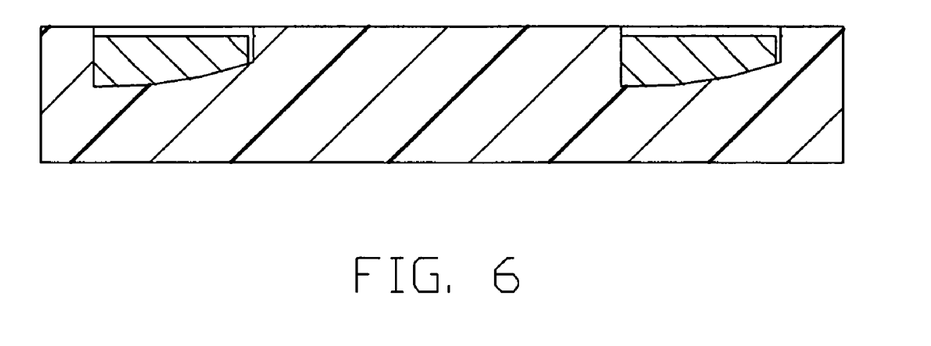
FIG. 6 is a cross-sectional view of part of a backlight module of an LCD according to a second exemplary embodiment of the present invention.
Figure 7:
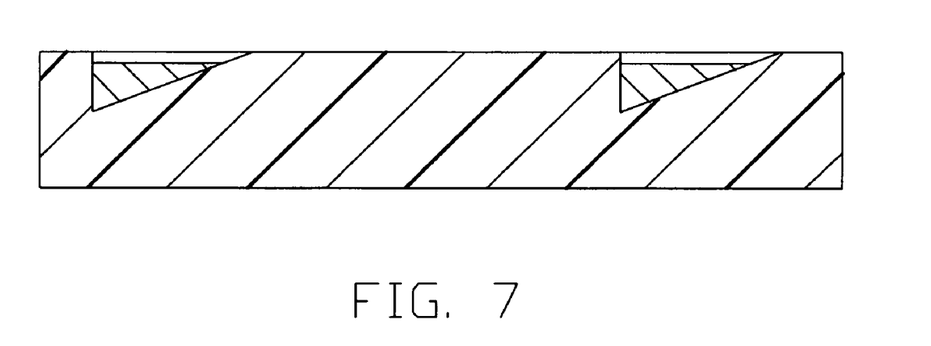
FIG. 7 is a cross-sectional view of part of a backlight module of an LCD according to a third exemplary embodiment of the present invention.

In alternative embodiments, the bottom surface 565 of each protrusion 56 and the bottom surface 885 of each notch 88 can be curved surfaces, as shown in FIG. 6. The second side surface 562 of each protrusion 56 and the second side surface 882 of the notch 88 can be right-angled triangles, as shown in FIG. 7. Furthermore, the light guide plate 50 can have only two protrusions 56, which outwardly extend from the first side surface 53 and the second side surface 55 respectively.

It is to be further understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display comprising:
a liquid crystal display panel; and
a backlight module positioned adjacent to the liquid crystal panel, the backlight module comprising:
   a light guide plate, comprising:
      a light emitting surface;
      a bottom surface opposite to the light emitting surface;
      a light incident surface perpendicularly connected with the light emitting surface;
      a first side surface perpendicularly connected with both the light incident surface and the light emitting surface;
      a second side surface opposite to the first side surface;
      at least one protrusion outwardly extending from the first side surface and forming an inclined or a curved bottom surface at the same side with the bottom surface of the light guide plate side; and
      at least one protrusion outwardly extending from the second side surface and forming an inclined or a curved bottom surface at the same side with the bottom surface of the light guide plate side;
   wherein a center of gravity of each protrusion closes to the light incident surface of the light guide plate.

2. The liquid crystal display of claim 1, wherein the liquid crystal display further includes a frame configured for accommodating the light guide plate, the frame includes a first side wall corresponding to the first side surface of the light guide plate, a second side wall corresponding to the second side surface of the light guide plate and a third side wall corresponding to the light incident surface of the light guide plate; both the first side wall and the second side wall of the frame have at least one notch configured for accommodating the corresponding at least one protrusion of the light guide plate; each notch of the frame defines an inclined or a curved bottom surface contacting with the corresponding bottom surface of the protrusion, such that the protrusions of the light guide plate tend to slide toward to the third side wall of the frame.

3. The liquid crystal display of claim 2, wherein the liquid crystal display further includes a light source assembled within the frame and located between the third side wall of the frame and the light incident surface of the light guide plate, the light source includes a metal strip and a plurality of light emitting diodes adhered on the metal strip facing toward the light incident surface; the light incident surface contacts the plurality of light emitting diodes correspondingly.

4. A light guide plate, comprising:
a top light emitting surface;
a bottom surface;
a light incident surface perpendicularly adjacent to the light emitting surface;
a first side surface perpendicularly adjacent to both the light incident surface and the light emitting surface;
a second side surface, the first and second side surfaces being at opposite sides of the light guide plate;
at least one protrusion outwardly extending from the first side surface; and
at least one protrusion outwardly extending from the second side surface;
wherein a thickness of the at least one protrusion of the first side surface decreases with increasing distance away from the light incident surface, and a thickness of the at least one protrusion of the second side surface decreases with increasing distance away from the light incident surface, such that each of the protrusions includes an inclined bottom surface extending upwardly towards the top light emitting surface, and the bottom surface of the protrusion located at the same side of the top light emitting surface with the bottom surface of the light guide plate.

5. The light guide plate of claim 4, wherein each of the protrusions further comprises a top surface opposite to the bottom surface, a first side surface connected with both the top surface and the bottom surface, a second side surface opposite to the first side surface, and a third side surface opposite to the first side surface of the light guide plate, the top surface and the light emitting surface of the light guide plate are coplanar, the first side surface is parallel to the second side surface, and both the first side surface and the second side surface are perpendicular to the top surface.

6. The light guide plate of claim 5, wherein the third surface is a right-angled trapezoid.

7. The light guide plate of claim 5, wherein the distance between a center of gravity of the protrusion and the first side surface is greater than that between the center of gravity of the protrusion and the second side surface.

8. The light guide plate of claim 7, wherein the distance between the first side surface and the light incident surface of the light guide plate is greater than that between the second side surface and the light incident surface of the light guide plate.

9. The light guide plate of claim 5, wherein the third surface is a right-angled triangle.

10. The light guide plate of claim 4, wherein the at least one protrusion of the first side surface comprises two protrusions, and the at least one protrusion of the second side surface comprises two protrusions.

11. A backlight module, comprising:
a light guide plate, comprising:
   a light emitting surface;
   a bottom surface opposite to the light emitting surface;
   a light incident surface perpendicularly connected with the light emitting surface;
   a first side surface perpendicularly connected with both the light incident surface and the light emitting surface;
   a second side surface opposite to the first side surface;
   at least one protrusion outwardly extending from the first side surface and forming an inclined or a curved bottom surface at the same side with the bottom surface of the light guide plate side; and
   at least one protrusion outwardly extends extending from the second side surface and forming an inclined or a curved bottom surface at the same side with the bottom surface of the light guide plate side; and
a frame configured for accommodating the light guide plate, the frame comprising:
   a first side wall contacting the first side surface of the light guide plate, the first side wall having at least one notch configured for accommodating the at least one protrusion of the first side surface of the light guide plate;
   a second side wall contacting the second side surface of the light guide plate, the second side wall having at least one notch configured for accommodating the at least one protrusion of the second side surface of the light guide plate; and
   a third side wall contacting the light incident surface of the light guide plate;
wherein each protrusion defines a length along a direction perpendicular to the light incident surface, and a center of gravity of each protrusion is between a center of the length of the protrusion and an end of the protrusion closest to the light incident surface; each notch of the frame defines an inclined bottom surface contacting with the corresponding inclined bottom surface of the protrusion.

12. The backlight module of claim 11, further comprising a light source assembled within the frame and located between the third side wall of the frame and the light incident surface of the light guide plate with a plurality of light emitting diodes facing toward the light incident surface; the light incident surface contacts the plurality of light emitting diodes correspondingly.

13. The backlight module of claim 12, wherein the third side surface of the notch is a right-angled trapezoid.

14. The backlight module of claim 11, wherein each of the notch comprises a first side surface, a second side surface parallel to the first side surface, a third side surface connected with both the first side surface and the second side surface, the first side surface, the second side surface, and the third side surface are all perpendicular to the top surface of the frame, a length of a border intersected by the first side surface and the third side surface is less than that of a border intersected by the second side surface and the third side surface.

15. The backlight module of claim 14, wherein a distance between the first side surface of the notch and the second side surface of the notch is greater than that between the first side surface of the protrusions and the second side surface of the protrusions.

* * * * *